United States Patent
Kurtz et al.

[11] Patent Number: 5,966,136
[45] Date of Patent: Oct. 12, 1999

[54] EFFICIENT METHOD FOR CLIPPING NUMEROUS OBJECTS AGAINST AN ARBITRARY CLIPPING PATH

[75] Inventors: Barry D. Kurtz; Steven J. Claiborne, both of Boise, Id.

[73] Assignee: Hewlett-Packard Co., Palo Alto, Calif.

[21] Appl. No.: 08/422,188

[22] Filed: Apr. 12, 1995

[51] Int. Cl.⁶ .................................................. G06T 11/00
[52] U.S. Cl. .......................................................... 345/434
[58] Field of Search ................................... 395/133, 134, 395/120–122, 125–127, 135; 345/501, 420–435

[56] References Cited

U.S. PATENT DOCUMENTS

| | | |
|---|---|---|
| 5,201,011 | 4/1993 | Bloomberg et al. ...................... 382/9 |
| 5,307,451 | 4/1994 | Clark ....................................... 395/127 |
| 5,371,514 | 12/1994 | Lawless et al. ...................... 395/135 X |
| 5,487,145 | 1/1996 | Marsh et al. ............................ 345/501 |
| 5,509,115 | 4/1996 | Butterfield et al. .................... 345/418 |

*Primary Examiner*—Almis R. Jankus
*Attorney, Agent, or Firm*—Anthony J Baca

[57] ABSTRACT

A method and apparatus for clipping a objects against a non-rectangular polygon. The present invention first defines a rectangular buffer with a height and width equal to the maximum height and width of the non-rectangular polygon. Next, each object is clipped against the rectangular buffer using a fast rectangular clipping method. After all the objects have been clipped, the rectangular buffer is converted to a pattern buffer. Finally, the pattern buffer is clipped against the non-rectangular polygon using an arbitrary clipping method.

11 Claims, 8 Drawing Sheets

EFFICIENT METHOD FOR CLIPPING NUMEROUS OBJECTS AGAINST AN ARBITRARY CLIPPING PATH

TECHNICAL FIELD

The present invention relates to computer graphics systems, more specifically, to a method for arbitrarily shaped polygon clipping. Arbitrarily shaped polygon clipping is the process of removing parts of objects that lie outside a region called the bounded by an arbitrarily shaped polygon.

BACKGROUND OF THE INVENTION

Computer graphic systems, including graphic printers, define pictures in a world coordinate system. This can be any Cartesian coordinates system that a user finds convenient. Pictures defined in world coordinates are then mapped by the graphic system into device coordinates, where the device may be for example, a computer screen or a printed page. Typically, a graphic system allows a user to specify which area of the picture definition is to be displayed and where it is to be placed on the display device. A single area can be chosen for display, or several areas can be selected. These areas can be placed in separate display locations, or one area can serve as a small insert into a larger area. This transformation process involves operations for transformation and scaling selected areas and for deleting picture parts outside the areas. These operations are referred to as windowing and clipping.

A rectangle area specified in world coordinates is called a window. The rectangular area on the display device to which a window is mapped is called a viewport. By changing the position of the viewport, objects can be displayed at different positions on an output device. Also, by varying the size of the viewport, the size and proportions of an object can be changed. When different sized windows are successively mapped onto a viewport, zooming effects can be achieved. As the windows are made smaller, a user can zoom in on some part of a scene to view details that are not shown with the larger windows. Similarly, more overview is obtained by zooming out from a section of a scene with successively larger windows. Panning effects are produced by moving a fixed-sized window across a larger picture.

Mapping a window onto a viewport results in the display of only the picture parts within the window. Everything outside the windowing is discarded. Procedures for eliminating all parts of a defined picture outside of specified boundaries are referred to as clipping.

Clipping procedures are generally classified as either a line clipper or a polygon clipper. A line clipper determines which lines are wholly within the window boundaries and which lines are to be totally or partially clipped. For lines that are to be partially clipped, the intersection points with the window boundaries must be calculated. Because a picture may contain thousands of line segments, the clipping process should be performed as efficiently as possible. One such line clipper was developed by Cohen and Sutherland. Another line clipper was developed by Liang and Barsky. Both these line clippers are known in the art of computer graphics.

Another technique for clipping developed by Liang and Barsky, performs clipping by expressing each edge as a parametric equation. Using this notation, the possible contributions that can be provided to the output polygon by a particular edge of the input polygon are enumerated. See, You-Dong Liang and Brian A. Barsky "An Analysis and Algorithm for Polygon Clipping," *Communication of the ACM*, 26, 11, 868–877 (November 1983) herein incorporated by reference. One advantage to the Liang and Barsky process is that arbitrarily shaped windows could be processed by using parametric line equations to describe both the window boundaries and the boundaries of the areas to be clipped.

SUMMARY OF THE INVENTION

The present invention is a method and apparatus for clipping an object against a non-rectangular polygon. The present invention first defines a rectangular buffer also called a mosaic buffer. The rectangular buffer has a height equal to the maximum height and a width equal to the maximum width of the non-rectangular polygon. Next, the object is clipped against the rectangular buffer using a fast rectangular clipping method. After clipping is completed, the rectangular buffer is converted to a pattern buffer. Finally, the pattern buffer is clipped against the non-rectangular polygon using an arbitrary clipping method.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

The present invention is not limited to a specific embodiment illustrated herein. As described above, numerous methods for clipping against a rectangular clipping path are known in the art. Several of these clipping methods can even be extended to clip against arbitrarily shaped polygon clipping paths. However, once an arbitrarily shaped polygon clipping path is used, throughput through the clipper drops off significantly. Some applications can withstand this reduction in throughput, while others may be adversely impacted. In particular, those applications requiring real time clipping, such as, laser printers, must insure that the clipping is completed within the allotted time. Focusing the remainder of the discussion to the particular application of a laser printer, such real time constraints will be better understood.

With today's laser printers, also referred as electrophotographic printers, once the media starts moving the laser needs a continuous supply of image data. Numerous methods are employed to insure that the laser receives data in a timely fashion. One simple method is to insure that the formatting system for the laser printer has sufficient processing power to guarantee that all computations can be done faster than the laser can print them to the media. However, if a page becomes so complicated such that the processor cannot provide a continuous data stream to the laser, that page must be prerendered into printer memory and then read from memory directly to the laser. Such preprocessing consumes considerable amounts of memory. If a page contains numerous arbitrary clipping paths, the processor may quickly become overtaxed thus requiring prerendering of the page to memory.

Using known clipping methods, objects can be clipped against a rectangular clipping path significantly faster than against an arbitrarily shaped clipping path. With this understanding it makes sense to limit the number of arbitrarily shaped clipping paths. However, such a limitation is not practical or desirable. The present invention uses this understanding to reduce the number of times the arbitrary clipping path method must be used.

In short, the preferred embodiment of the present invention defines a rectangular clipping region, called a mosaic buffer. All subsequent incoming objects are clipped against this rectangular buffer. Because the mosaic buffer is rectangular, the more efficient rectangular clipping method can be used. Once all the incoming objects have been clipped against the mosaic buffer, the contents of the mosaic buffer is clipped against the original arbitrary clipping path. Thus, the arbitrary clipping routine is executed only one time as opposed to executing each time for the plurality of objects in the mosaic buffer. For even faster arbitrary clipping, a raster operation method of arbitrary clipping is used to clip the contents of the mosaic buffer against the original arbitrary clipping path.

Figure 1:
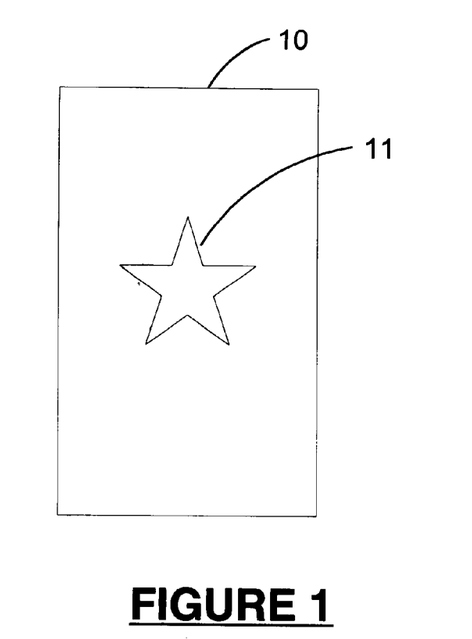
FIG. 1 shows a representation of Page 10 and Arbitrary Path 11.

With that high level description of the present invention a detailed description of the preferred embodiment will now be given. Referring first to FIG. 1, where the representation of a PAGE 10 and an ARBITRARY PATH 11 are shown. Prior to the present invention each object that is to be rendered into ARBITRARY PATH 11 on PAGE 10 would be clipped against ARBITRARY PATH 11 using an arbitrary path clipping method. However, one skilled in the art after reading the following description of the present invention will understand that the number of times that the arbitrary clipping method must be executed is reduced to one.

Figure 2:
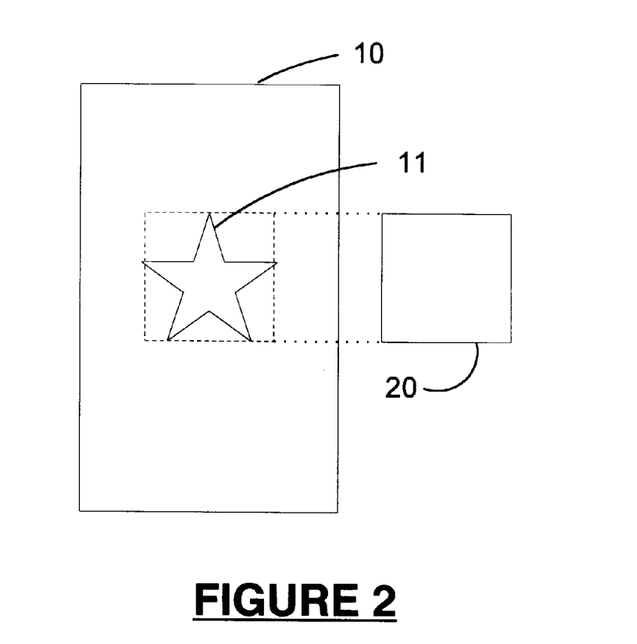
FIG. 2 shows the relationship between Mosaic Buffer 20 and Arbitrary Path 11.
Figure 3:
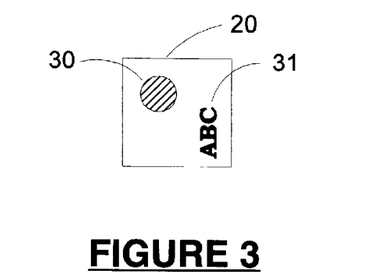
FIG. 3 shows the result of rectangular clipping into Mosaic Buffer 20.
Figure 4:
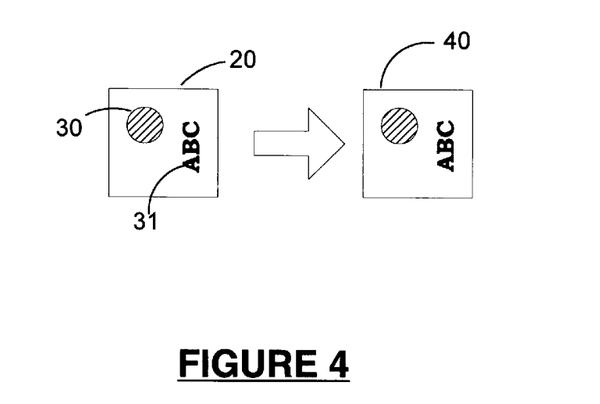
FIG. 4 pictorially presents the conversion of Mosaic Buffer 20 into Pattern 40.

Referring next to FIG. 2 the first step of the preferred embodiment of the present invention is to define a rectangular buffer (herein referred to as a MOSAIC BUFFER 20.) This MOSAIC BUFFER 20 should completely enclose ARBITRARY PATH 11. Next, in FIG. 3 all subsequent objects such as TEXT 31, CIRCLE 30 and the like, are clipped into MOSAIC BUFFER 20. Because MOSAIC BUFFER 20 is rectangular, an efficient rectangular clipping method is used. Once all the objects designated for ARBITRARY PATH 11 have been clipped against MOSAIC BUFFER 20, MOSAIC BUFFER is converted to PATTERN 40 as shown in FIG. 4.

Figure 5:
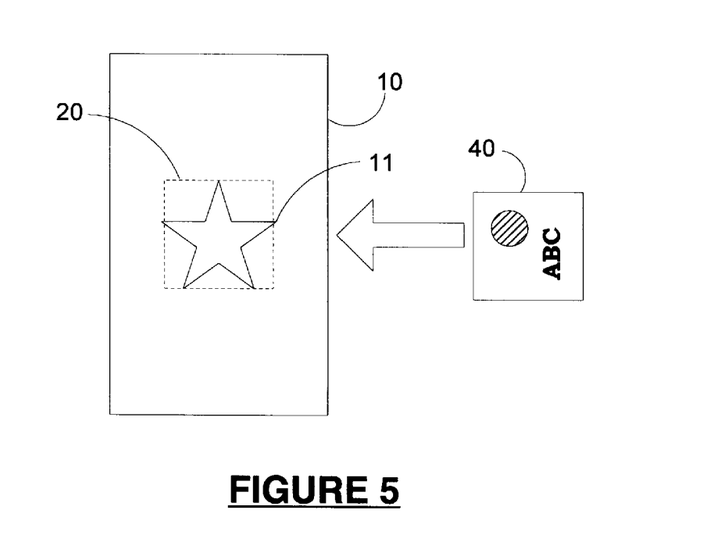
FIG. 5 pictorially presents the clipping of Pattern 40 against Arbitrary Path 11.

Depending on the rectangular clipping method used, each object may be rasterized as it is clipped against the MOSAIC BUFFER 20. The process of converting MOSAIC BUFFER 20 into PATTERN 40 rasterizes any objects that were not rasterized during the rectangular clipping, thereby insuring that PATTERN 40 contains only raster (i.e., bit-map) information. If, MOSAIC BUFFER 20 contains all raster information, the conversion to PATTERN 40 is simply a name change. Next, referring to FIG. 5, PATTERN 40 is clipped against ARBITRARY PATH 11. The results of this clipping can be seen in FIG. 6.

The clipping of PATTERN 40 against the ARBITRARY CLIPPING PATH 11 may be accomplished in several ways. In the preferred embodiment a raster operation method, as described below, is used. In an alternative embodiment, one of the known arbitrary clipping methods, such as those described above, may be used to accomplish the arbitrary clipping. The raster operation method of arbitrary clipping (herein referred to as ROP) provides significant performance advantages but also has a disadvantage of being memory intensive. The arbitrary clipping methods mentioned above do not suffer from the memory intensive requirements of the ROP method. However, those arbitrary clipping methods require significant computational resources.

Figure 7:
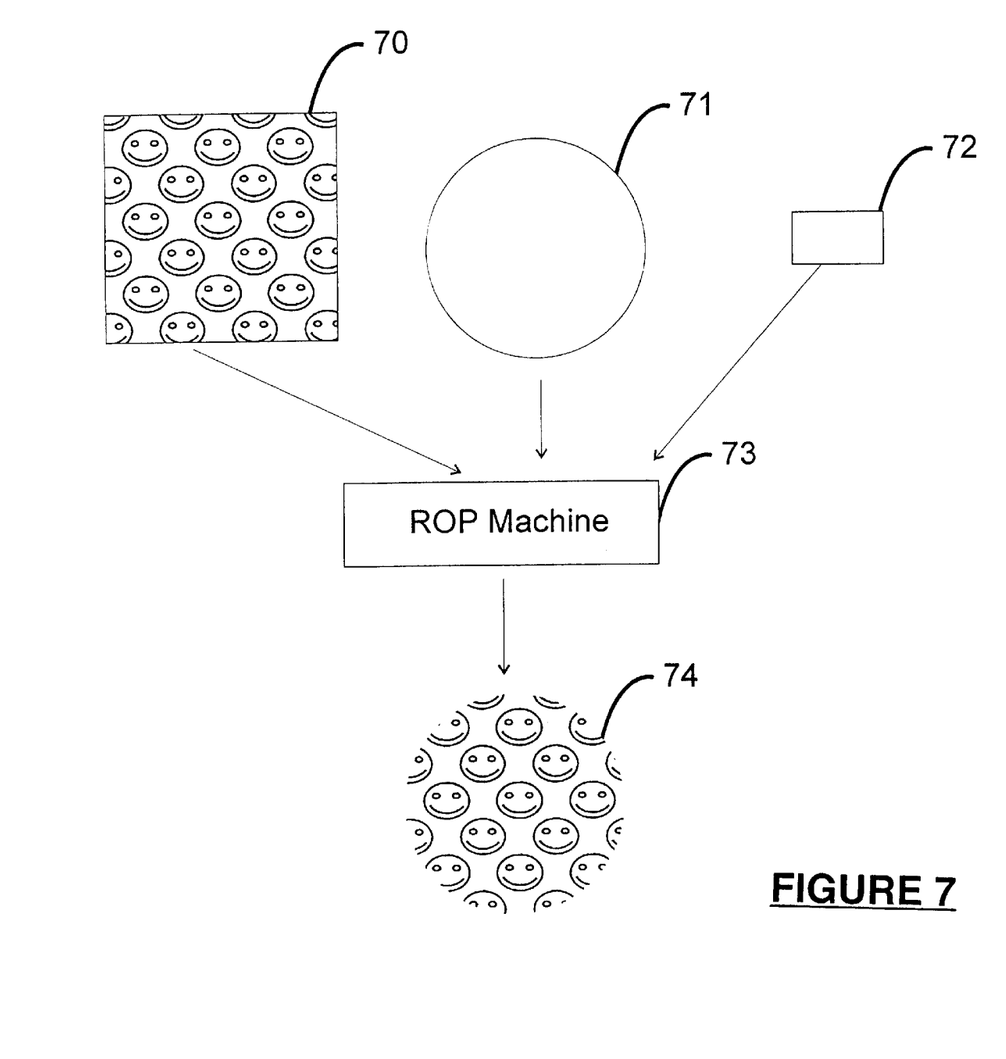
FIG. 7 graphically shows the inputs into the ROP Machine.

Referring now to FIG. 7, the high level pictorial representation of one embodiment of the ROP method of arbitrary clipping is shown. Here, PATTERN 70 is clipped against ARBITRARY PATH 71. Prior to performing the clipping operation, ARBITRARY PATH 71 is filled with FILL PATTERN 72. These 3 inputs are processed by the ROP MACHINE 73 to produce the FINAL OUTPUT 60.

A ROP MACHINE 73 performs the clipping based upon a bit-map input for PATTERN 70 in ARBITRARY PATH 71 and FILL PATTERN 72. It is this requirement of operating in the bit-map domain that makes the ROP process memory intensive.

Figure 6:
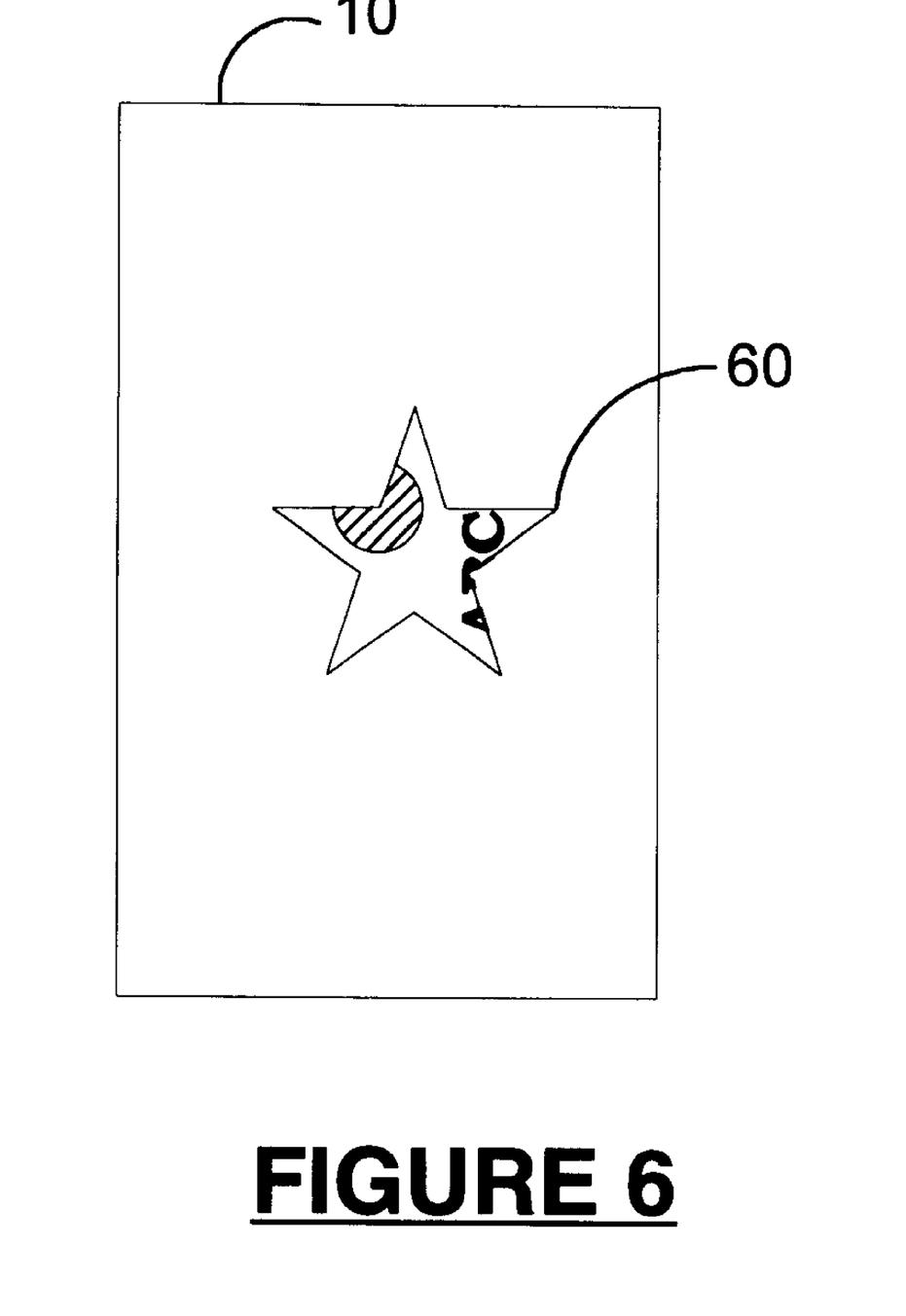
FIG. 6 shows the results of the clipping performed in FIG. 5.
Figure 8:
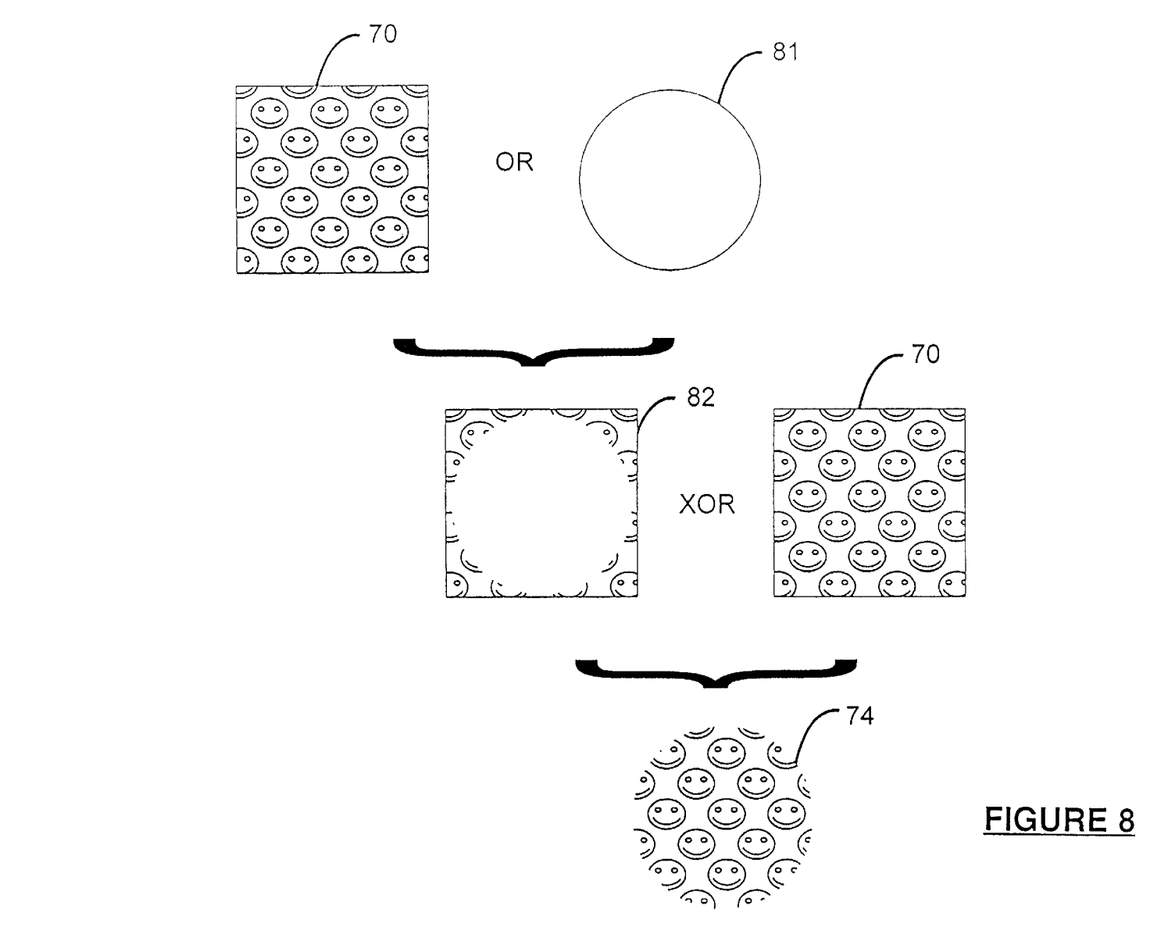
FIG. 8 graphically shows the raster operation method of arbitrary clipping used in FIG. 7.

Referring to FIG. 8 the actual ROP process executed by the ROP machine 73 of FIG. 7 is shown in more detail. First, in a bit wise fashion, PATTERN 70 is logically ORed (OR) with FILLED ARBITRARY PATH 81. Note, FILLED ARBITRARY PATH 81 is depicted in FIG. 8 by an outlined circle. This imaginary outlining has been added only to aid in understanding FIG. 8. The result of this logical operation is shown in element 82. Next, element 82 is XORed with original PATTERN 70. The output of this logical operation results in a final clipped object 74. One skilled in the art will understand that the operations of OR and XOR can be performed efficiently in either hardware or software. Thus, by performing the ROP clipping operation in hardware, the ROP clipping operation executes in a relatively short amount of time with little processing power.

Where the original ARBITRARY PATH 11 of FIG. 1 is large compared to the PAGE 10, the memory requirements of the ROP method described above may exceed the memory resources. Under this circumstance, the more computationally extensive arbitrary clipping methods known in the art may need to be used. Such a decision as to which clipping process will be used should be made early in the process. Referring back to FIG. 4 where it was stated that the transformation to the MOSAIC BUFFER 20 to PATTERN 40 was performed by rasterizing the MOSAIC BUFFER 20 into the bit-map PATTERN 40. However, if an arbitrary clipping method is going to be used as opposed to the ROP method, this rasterization may not be necessary. Thus, PATTERN 40 contains vector, raster, and font information as opposed to only raster information. As described above, FIG. 5 then performs the arbitrary clipping method and clips PATTERN 40 against ARBITRARY PATH 11 to produce the results as shown in FIG. 6.

Figure 9:
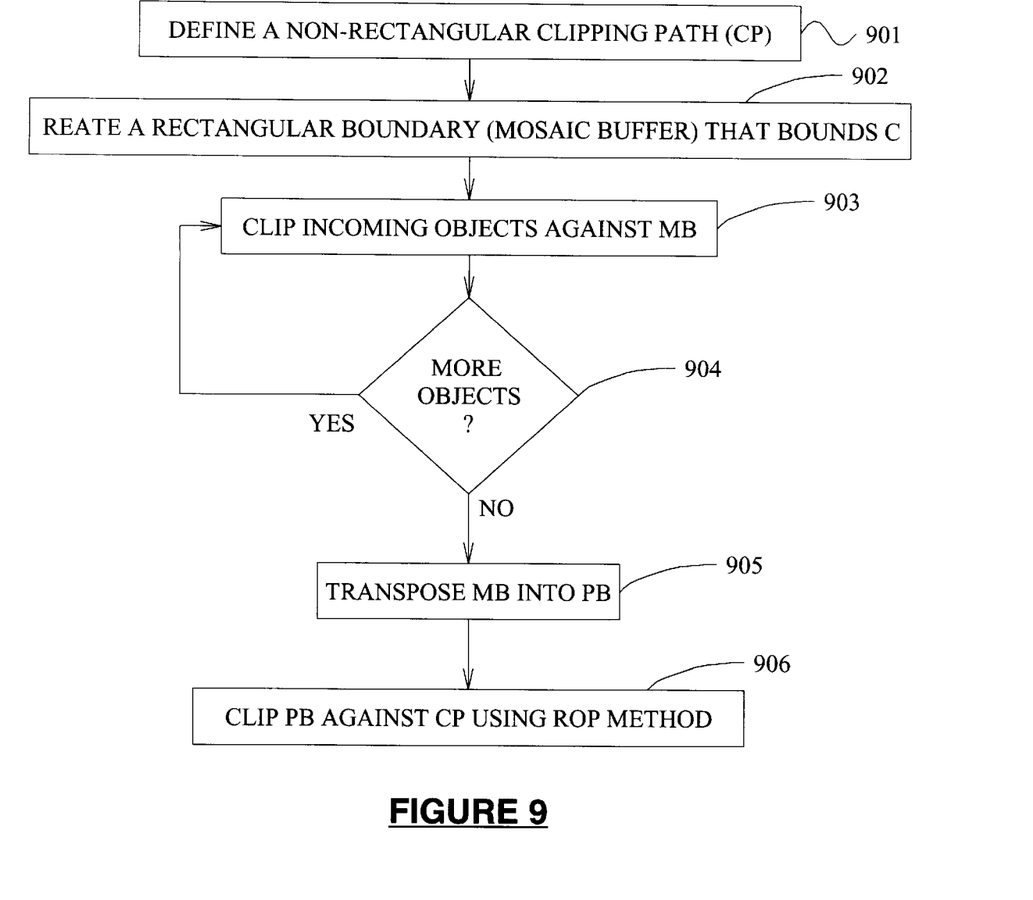
FIG. 9 is a simplified logical flowchart showing the preferred embodiment in accordance with the present invention.

Referring next to FIG. 9, the logical flow of the preferred embodiment will be described. Given the original PAGE 10 as shown FIG. 1, a non-rectangular clipping path (CP) is defined 901. One skilled in the art will understand that this non-rectangular clipping path may originate from many sources. However, to continue with the example of a printer, it is assumed that the system attached to the printer defines the non-rectangular clipping path and conveys that definition to the printer.

Next, a rectangular boundary, referred to as the MOSAIC BUFFER 20 in FIG. 2 is created 902. The dimensions of the MOSAIC BUFFER are defined to be exactly the width and height of the bounding region of the non-rectangular clipping path. Any objects originally intended for CP are clipped against the MOSAIC BUFFER (MB) using a fast rectangular clipping process (903, 904). After all object have been clipped against the non-rectangular clipping path, the MOSAIC BUFFER is transposed into the PATTERN BUFFER (PB) 905. Which fast rectangular clipping process (903) is used defines what operations must be performed to transpose the MB to the PB. For example, if the fast rectangular clipping process (903) outputs vector information, then the MB must be rasterized into the PB. In the alternative, the fast rectangular clipping process (903) may create a rasterized output as part of the clipping process. Here, transposing MB to PB is just a matter of copying the MB to PB. One skilled in the art understands that other possibilities exists.

Figure 11:
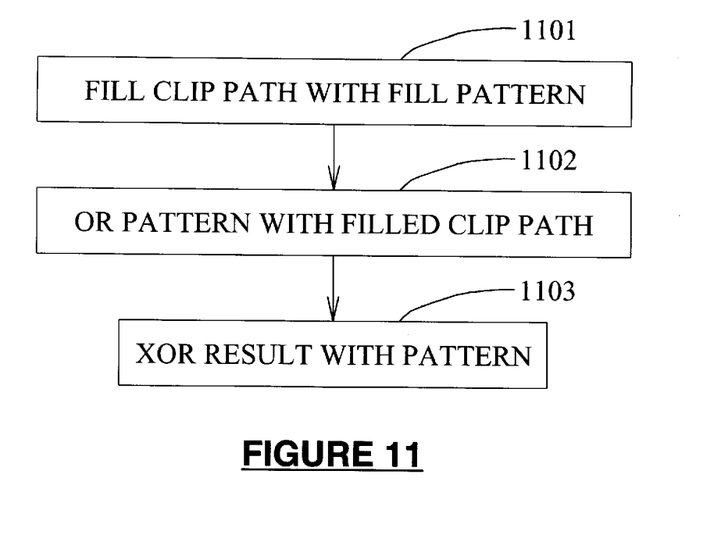
FIG. 11 is a simplified logical flowchart showing the raster operation method (ROP) of arbitrary clipping used in FIG. 7.

Finally, the contents of the PB are clipped against the original non-rectangular clipping path 906. The exact method used to perform this arbitrary clipping process may be performed by several methods, however, FIG. 9 uses the ROP method. A simplified flowchart showing the ROP method is shown in FIG. 11. First the non-rectangular clipping path is filled with the fill pattern 1101 and converted to a bit-map representation. In a bit-wise operation, the pattern buffer is ORed (OR) with the filled non-rectangular clipping path 1102. Finally, the result of 1102 is XORed with the original pattern buffer to produce the desired output.

Figure 10:
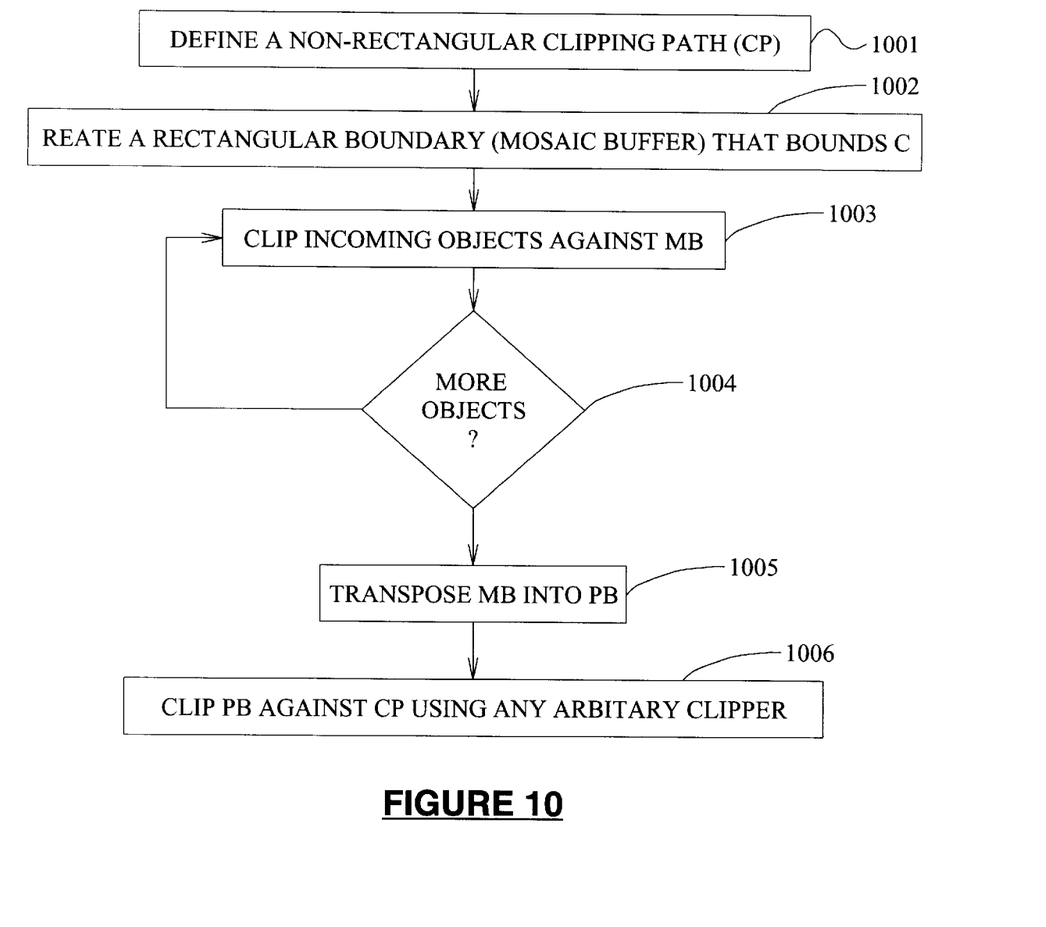
FIG. 10 is a simplified logical flowchart showing an alternative embodiment in accordance with the present invention.

Referring next to FIG. 10, the logical flow of an alternative embodiment will be described. As with the flowchart of FIG. 9, first a non-rectangular clipping path (CP) is defined 1001. Next, a rectangular boundary, referred to as the MOSAIC BUFFER 20 in FIG. 2 is created 1002. Any objects originally intended for CP are clipped against the MOSAIC BUFFER (MB) using a fast rectangular clipping process (1003, 1004). After all objects have been clipped against the non-rectangular clipping path, the MOSAIC BUFFER is transposed into the PATTERN BUFFER 1005. In this embodiment an arbitrary clipping process will be used, therefore, it is desirable to retain any vector information during the transformation from MB to PB . Thus, the contents of MB are simply moved into the PB. Finally, the contents of the PB are clipped against the original non-rectangular clipping path 1006.

Figure 12:
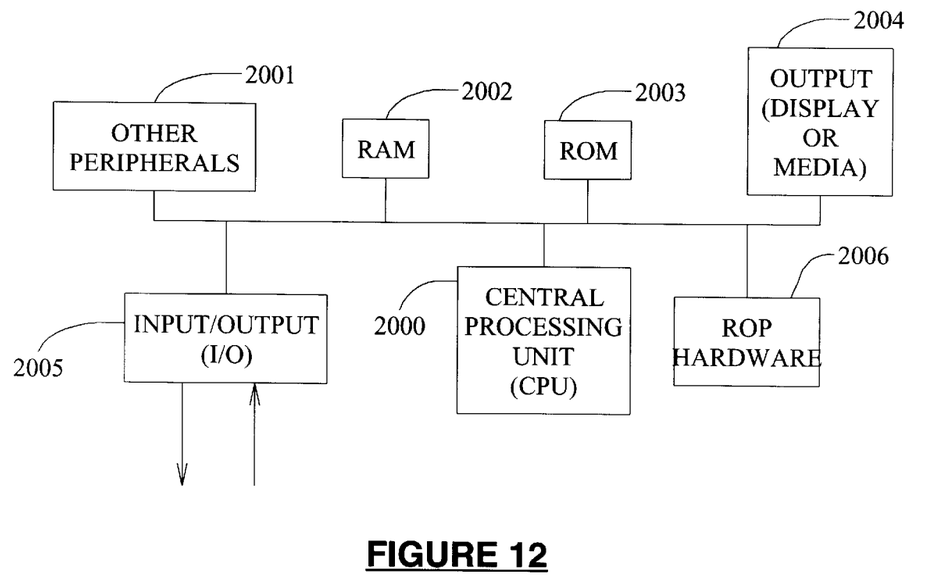
FIG. 12 is a block diagram of a printer or graphic display system used in accordance with the present invention.

Referring next to FIG. 12 where a block diagram of a printer, or graphic system is shown. A central processing unit (CPU) 2000 is connected to RAM 2002, ROM 2003, OUTPUT 2004, INPUT/OUTPUT (I/O) 2005 and OTHER PERIPHERALS 2001 by a bus system. In normal operation, CPU 2000 receives commands and data through I/O 2005. Based upon information received through I/O 2005, CPU 2000 executes various programs stored in either ROM 2003 or RAM 2002. OUTPUT 2004 may be either a display device such as a Cathode Ray Tube (CRT) or, as further described here, a printer.

For the system of FIG. 12 to perform the present invention, a non-rectangular clipping path is first transferred through I/O 2005 to CPU 2000. The non-rectangular clipping path is then stored in RAM 2002. CPU 2000, following instructions stored in ROM 2003, next defines a mosaic buffer which is also stored in RAM 2002. All subsequent objects, which may include text, vectors, and raster graphics, are passed through I/O 2005 to CPU 2000. CPU 2000 clips each object against the mosaic buffer. Clipped data is finally stored in RAM 2002. Finally, CPU 2000 receives a command through I/O 2005 indicating that either a new clipping path is to be defined or all objects have been transmitted.

After the CPU 2000 has clipped all of the objects destined for the non-rectangular clipping path, in accordance with the present invention the mosaic buffer is translated into the pattern buffer. The CPU 2000 next clips the pattern buffer against the original non-rectangular clipping path and stores the result back in RAM 2002. Such clipping may be accomplished by either ROP HARDWARE 2006 or any other arbitrary clipping method.

To use the ROP HARDWARE 2006, CPU 2000 transfers the pattern buffer, fill pattern and non-rectangular clipping path to ROP HARDWARE 2006. The output of ROP HARDWARE 2006 is directed to either OUTPUT 2004 or back into RAM 2002. If in the alternative, an arbitrary clipping method is used, CPU 2000 must execute they necessary instructions to perform the arbitrary clipping method.

CPU 2000 may need additional storage space or other peripherals not necessary for the present invention. Such additional peripherals are simply shown in FIG. 12 as OTHER PERIPHERALS 2001.

While the preferred embodiment has been described in conjunction with an electrophotographic printer, the present invention is equally applicable to other types graphical systems. Such systems include computer systems, imaging systems, and the like.

What is claimed is:

1. A method for clipping a plurality of objects against an arbitrary clipping path, said arbitrary clipping path having a height and width, said method comprising steps of:

defining a rectangular buffer, said rectangular buffer having a height and width equal to the height and width of said arbitrary clipping path;

rectangular clipping said plurality of objects against said rectangular buffer, said rectangular clipping being performed by a rectangular clipping method; and arbitrarily clipping said rectangular buffer against said arbitrary clipping path, said step of arbitrarily clipping being performed by a raster operation method.

2. The method as claimed in claim 1 wherein said step of raster operation method comprising the steps of:

filling said arbitrary clipping path with a fill pattern;

performing the logical operation of ORing said rectangular buffer with said filled arbitrary clipping path to produce an intermediate result; and performing the logical operation of exclusive ORing said intermediate result with said rectangular buffer.

3. The method as claimed in claim 1 wherein said plurality of objects comprising:

a first set of objects described in a raster format;

a second set of objects described in a vector format; and a third set of objects described in a font format.

4. A method for clipping a plurality of objects against a non-rectangular polygon, said non-rectangular polygon having a maximum height and maximum width, said method comprising steps of:

defining a rectangular buffer, said rectangular buffer having a height equal to the maximum height of said non-rectangular polygon and a width equal to the maximum width of said non-rectangular polygon;

first clipping said plurality of objects against said rectangular buffer;

converting said rectangular buffer to a pattern buffer; and second clipping said pattern buffer against said non-rectangular polygon.

5. The method as claimed in claim 4 wherein said step of converting converts said rectangular buffer into a bit mapped representation in said pattern buffer.

6. The method as claimed in claim 5 wherein said step of second clipping being performed by a raster operation method.

7. The method as claimed in claim 6 wherein said step of raster operation method comprising the steps of:

filling said non-rectangular polygon with a fill pattern;

performing the logical operation of ORing said pattern buffer with said filled non-rectangular polygon to produce an intermediate result; and performing the logical operation of exclusive ORing said intermediate result with said pattern buffer.

8. The method as claimed in claim 4 wherein said plurality of objects comprising:

a first set of objects described in a raster format;

a second set of objects described in a vector format; and a third set of objects described in a font format.

9. An apparatus for clipping a plurality of objects against a non-rectangular polygon, said apparatus comprising:

a memory;

a processor connected to said memory, said processor executes a sequence of instructions stored in said memory;

a means for defining a rectangular buffer, where said rectangular buffer encompasses said non-rectangular polygon;

a means for rectangular clipping said plurality of objects against said rectangular buffer, said processor storing said clipped plurality of objects in said memory;

a means for transforming said rectangular buffer into a pattern buffer, said pattern buffer being stored in memory; and a means for clipping said pattern buffer against said non-rectangular polygon.

10. The apparatus of claim 9 further comprising:

a display means for displaying said plurality of objects, said display means connected to said processor; and said processor transferring said clipped pattern buffer from said memory to said display means.

11. The apparatus of claim 9 wherein said plurality of objects comprising:

a first set of objects described in a raster format;

a second set of objects described in a vector format; and a third set of objects described in a font format.

* * * * *